US006961145B2

United States Patent
Smith

(12) United States Patent
(10) Patent No.: US 6,961,145 B2
(45) Date of Patent: Nov. 1, 2005

(54) SYSTEM AND METHOD FOR THE REPRODUCTION OF OVERSIZE DOCUMENTS

(75) Inventor: Craig A. Smith, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 992 days.

(21) Appl. No.: 09/769,980

(22) Filed: Jan. 25, 2001

(65) Prior Publication Data

US 2002/0097448 A1 Jul. 25, 2002

(51) Int. Cl.[7] ............................. G06F 15/00; G06K 1/00
(52) U.S. Cl. ..................... 358/1.2; 382/275; 382/284; 382/294; 358/1.17
(58) Field of Search ................................ 382/275, 284, 382/294; 358/1.2

(56) References Cited

U.S. PATENT DOCUMENTS 5,465,163 A * 11/1995 Yoshihara et al. .......... 358/444
5,821,915 A * 10/1998 Graham et al. ............. 345/615
6,038,349 A * 3/2000 Cullen ....................... 382/294
6,128,416 A * 10/2000 Oura ......................... 382/284

* cited by examiner

Primary Examiner—Edward Coles
Assistant Examiner—Yixing Qin
(74) Attorney, Agent, or Firm—Oliff & Berridge, PLC; Eugene Palazzo

(57) ABSTRACT

A method for the reproduction of oversize documents is disclosed. The method utilized by the present invention copies or scans in stages an oversize document that exceeds the copy or scan surface of the image reproduction apparatus available. Each separate document portion copied or scanned is saved as an image in memory. After all of the oversize document has been copied or scanned, the images of the document portions are reassembled, aligned and reduced in size, if necessary. The reassembled document may then be printed for a user or manipulated in memory using image processing software.

26 Claims, 4 Drawing Sheets

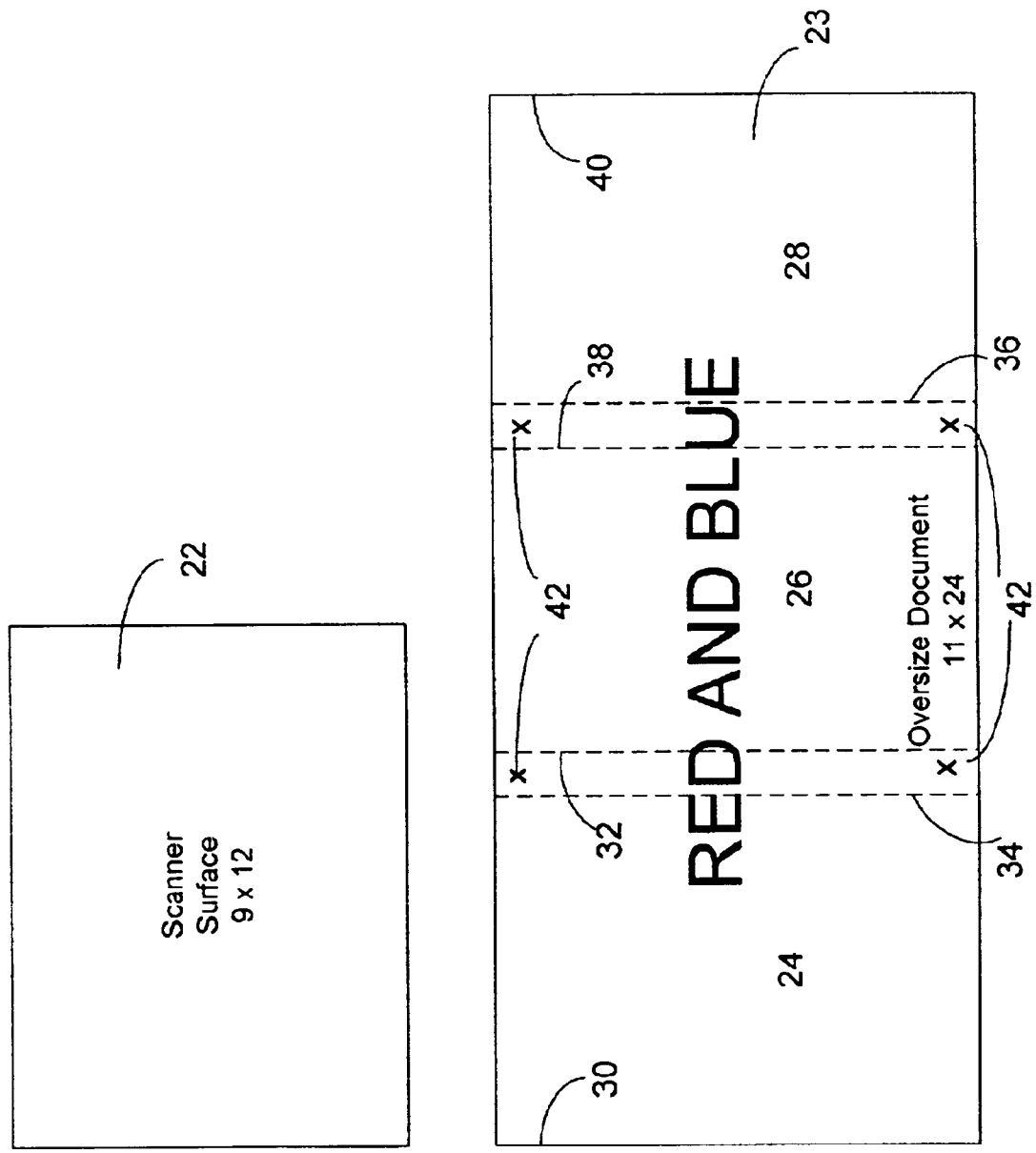

SYSTEM AND METHOD FOR THE REPRODUCTION OF OVERSIZE DOCUMENTS

FIELD OF THE INVENTION

This invention relates generally to the reproduction of documents and more particularly to the reproduction of oversize documents.

BACKGROUND OF THE INVENTION

Conventionally, the reproduction of documents occurs using one of two methods. In the first method, a document is copied on a stand-alone office copier which makes a duplicate image of the original document and prints out a copy. The second method commonly employed today is to scan a document and then print out an image of the scanned document. The scanners may be connected to a computer system hooked up to a printer, or may be part of a multi-function electronic device which has both scanning and printing capabilities.

Both of the conventional methods of reproducing documents, the stand-alone copier and the scanner, suffer from the same drawback. Both methods employ a document reproduction surface as part of the copier or scanner. The document reproduction surface is a fixed size. On stand-alone copiers, this fixed size is generally 11"×17". The same limitations apply to scanners, there is only a fixed surface on which to scan the document. In other words, some documents are simply too big for the available document reproduction surface. Those documents which exceed the document reproduction surface are only partially copied. These types of documents are referred to as oversize documents.

SUMMARY OF THE INVENTION

The illustrated embodiment of the current invention provides a method for reproducing oversize documents. Oversize documents are partitioned into separate images of document portions, each portion possessing dimensions that will fit on the available finite surface of an image reproducing apparatus. The individual images of document portions are held in the memory of the image reproducing apparatus until all of the oversize document has been processed (in the event the image reproducing apparatus is a scanner, the scanner memory may be part of the same multi-function electronic device as the scanner or the scanner may be part of a computer sytem to which the scanner is connected). Upon completion of the image reproducing process, image processing software is used to manipulate the images of the document portions so that they overlap and reassemble in the correct order. Overlapping duplicative document portions are deleted, the image is reduced or enlarged if necessary, and the reproduced image is then printed or stored in a permanent memory location for later use.

In one embodiment of the present invention, an image reproducing apparatus such as a digital copier includes memory, a processor and an image reproduction surface. A document with a dimension greater than the available image reproduction surface is processed in portions of less than the whole document. The image of each portion of the oversize document is held in the memory of the image reproducing apparatus until all of the oversize document has been processed. Image processing software is used to reassemble the images of document portions into a continuous whole image. The image is printed out for a user, first being reduced or enlarged in size if necessary. Alternatively, the image may be stored in a permanent memory location for later use instead of being printed out.

In another embodiment of the present invention, a multi-function electronic device is equipped with a scanner and a printer. The scanner includes a finite scanning surface upon which to scan documents. A document possessing a dimension greater than the available scanning surface is scanned in stages into the memory of the electronic device, each portion of the original oversize document being saved as a separate image. When the entire document has been scanned in portions, the oversize document is reassembled from the image portions contained in the electronic device memory. The image of the oversize document is then printed using the printer portion of the electronic device.

In a different embodiment of the present invention, a scanner is connected to a computer system. The computer system is also connected to a printer. The scanner includes a scanning surface upon which to scan documents. A document which has a dimension greater than the dimension of the scanning surface available to the scanner is scanned by the scanner in stages. Portions of the document are saved as separate images in the memory of the computer system the scanner is attached to. When all of the oversize document has been scanned in stages, the different images of document portions are reassembled in the memory of the computer system. The original document is then printed using the printer connected to the computer system.

BRIEF DESCRIPTION OF THE DRAWINGS

FIG. 2 depicts a block diagram of a scanner and an oversize document partitioned according to the illustrated embodiment.

DETAILED DESCRIPTION OF THE INVENTION

The illustrated embodiment of the present invention enables the reproduction of oversize documents on a standard image reproducing apparatus such as a digital copier. Alternatively, the illustrated embodiment of the present invention also enables the reproduction of oversize documents utilizing a conventional scanner. The method utilized by the present invention provides for the document to be processed in stages with each separate document portion being saved as an image in memory. The document portion images are reassembled using imaging processing software and then either printed or stored in a permanent memory location for later use.

Conventional methods of image reproduction encounter a simple mathematical problem. The machines image reproduction surfaces possess certain finite dimensions. Accordingly, documents which a user wishes to reproduce are sometimes larger than the available image reproduction surface of the image reproduction apparatus and therefore cannot be entirely processed in one operation by the image reproduction apparatus. Users must resort to measures such as reproducing portions of a document in separate processes and using tape to tape the reproductions together. The resulting patchwork copy is as large as the original oversize document. If the user wishes to reduce the size of the original document each image portion must be copied and reduced prior to patching them together. If the user wishes a single copy which has not been patched together, the now reduced patchwork copy can be reproduced in a conventional manner but the resulting reproduction may suffer from image degradation as the result of the multiple steps required to produce the reproduction.

Figure 1:
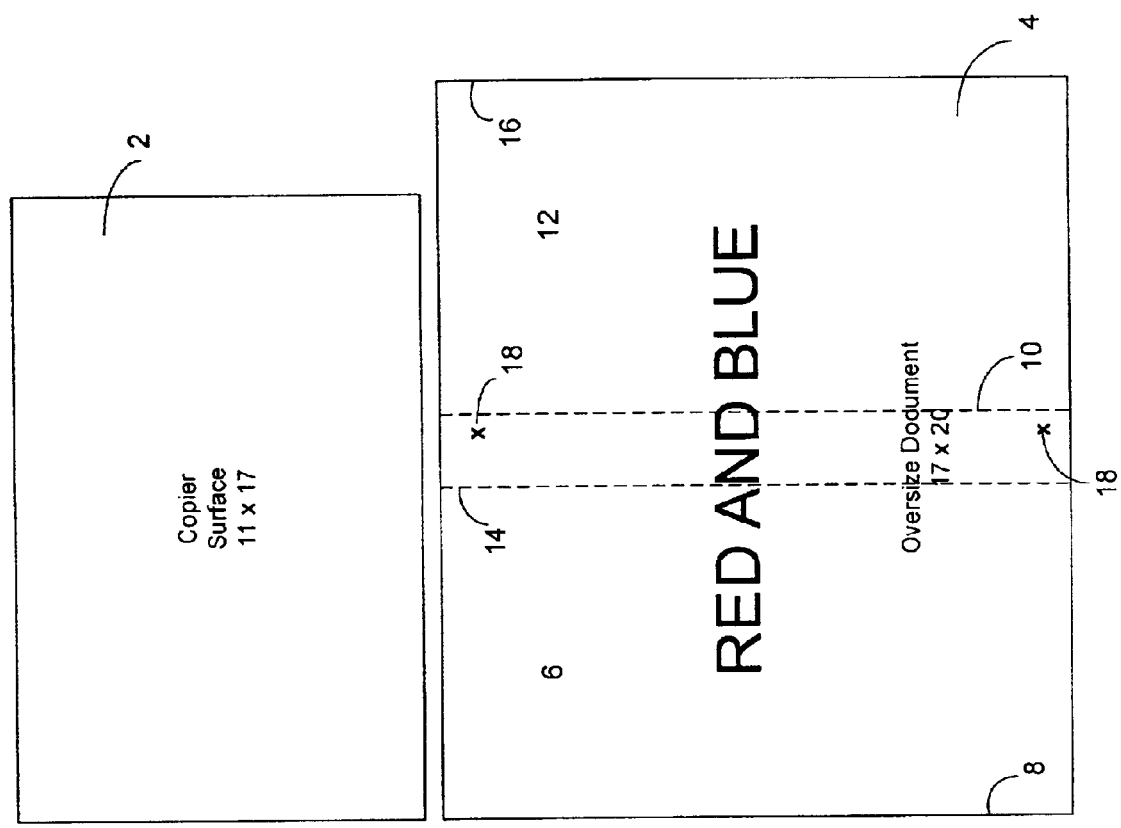
FIG. 1 depicts a block diagram of the image reproduction surface of an image reproducing apparatus and an oversize document partitioned according to the illustrated embodiment.

FIG. 1 depicts the problem encountered by conventional methods of image reproduction of oversize documents and the solution provided by the the present invention. FIG. 1 includes an image reproduction apparatus, a standard copier, with a copier surface 2 possessing a dimension of 11"×17". The 11×17" copier surface is depicted since it has become a standard dimension on many office copiers, such as the Xerox™ DOCUCOLOR 40C (XDC40C), Xerox Corporation, Rochester, N.Y. An oversize document 4 with dimensions 17"×20" is also depicted. The oversize document 4 is too big to be copied all at once on the available copier surface 2. The present invention views the oversized document 4 as two overlapping segments, a left document portion 6 with a left edge 8 and right edge 10 and a right document portion 12 with a left edge 14 and a right edge 16. Two marks, shown as an "×" 18, are depicted in the area where the two segments overlap and will be explained more fully below. The oversize document 4, which originally contained the dimensions of 17"×20", is split into two sub-documents 6, 12 for copying purposes. Each sub-document 6, 12 possesses a dimension of 17"×11", which is the same size as the available copier surface. Those skilled in the art will realize that the sub-documents 6, 12 do not have to be the exact size of available copier surface as long as they are not larger than the available copier surface. Prior to copying the oversize document 4, a user affixes a mark such as the "×" 18 to an oversize document in a position such that it would appear in both images. Both sub-documents contain the mark "×" 18 in the portion of the sub-documents that overlap each other, the area between the right edge 10 of the left sub-document 6 and the left edge 14 of the right sub-document 12. The user would then copy the document selecting a special mode on the copier's user interface.

The user interface for the copier may be a touch-screen, keypad or other similar well-known interface. The interface includes user-selected modes of copying such as two-sided, sort, draft, etc. The user selects an "oversize" mode for copying on the machine. The oversize mode selection indicates to the copier that it is required to save multiple images in memory for the oversize document 4. The user first copies the left sub-document 6 and then copies the right sub-document 12 taking care to make sure the "×" 18 was within the copying surface 2 for both copies. Those skilled in the art will realize that the the interior edges 10, 14 in the partitioned document 4 are not required to have a particular position as long as the two sub-documents 6, 12 combined contain all of the data of the oversize document 4 and that the order in which the sub-documents are copied does not matter. The two sub-documents 6, 12 are not required to be exactly equal in dimension. The user thus can estimate positioning when placing the sub-documents onto the copier surface 2, and is not required to pre-mark the edges. The copier saves the image of the left portion 6 and the image of the right portion 12 in memory. Upon completion of the copying process, the user selects a command on the user interface that indicates the copying process is complete. Alternatively, at the time the user selects the oversize mode option on the copier, the user may indicate the number of sub-documents that will be copied. The image processing software in the copier is used to manipulate the images of the document portions 6, 12 such that the mark "×" 18 in each document portion overlays the mark from the other document portion. In this manner, the images are properly aligned. Those skilled in the art will realize that the mark affixed by a user to provide a reference point need not be an "×", but rather may be any sort of character or symbol that the image processing software is programmed to recognize. The alignment mark may be a single straight line or other type of mark, including a non-symetric mark, in the overlapping area between the sub-documents. The reassembly process is more precise with a longer line or non-symetric mark than it is with a shorter line or symetric mark since the number of possible ways to align the document is lessened. Once the images are aligned, the duplicative overlapping portion of the sub-documents 6, 12 is removed. For example, in FIG. 1 the data between the right edge 10 of the left portion 6 and the left edge 14 of the right portion 12, such as the letter "N" and part of the letter "D" from the text "RED AND BLUE", will appear in both images. The image processing software will only include the data from those sections once in the final image.

In one aspect of the illustrated embodiment, the re-assembled image of the original oversize document 4 is larger than available print stock for the copier. Accordingly, the image is reduced in size until it is small enough to fit on the available print media. For example, the oversize document 4 depicted in FIG. 1 has a dimension of 17" by 20". If the copier only possessed paper in standard sizes such as 8½×11, 11×14 or A4, it could not print the 17"×20" document without first reducing the document image prior to printing. In one aspect of the invention, this reduction is performed with user input with the user selecting the desired size. In another aspect of the invention, the size of the image is automatically reduced to the largest available paper size.

In another aspect of the present invention, the mark 18 affixed by a user on the original oversize document 4 may be made with a special ink. The image processing software of the copier recognizes the characteristics of the ink, such as the particular shade of green, and correspondingly treats the affixed mark 18 as the mark the image processing software needs to locate. Alternatively, the mark may be a special shape or symbol or a user-circled element on the document. Once the document portions have been aligned in memory, the mark is no longer needed or desired and may be deleted. In one aspect of the present invention, the image processing software will omit any such mark made with recognized special ink when the document is printed following the copy process. The image processing software may replace the mark with white space, or alternatively may fill in the space beneath the mark with data from the immediately adjoining image area. Alternatively, if the mark is obscuring useful data, the image processing software may remove the special ink mark when the image is stored in memory and leave the underlying data intact.

In a different aspect of the illustrated embodiment, the user may control the image processing software from the copier interface. The copier includes a display panel displaying the representation of the images of the different document portions of the oversize document. The display surface depicts the shapes of the sub-document images stored in memory, including the alignment marks "×" 18. The user uses the interface controls to align the images alignment marks "×" 18 by selecting and manipulating an appropriate re-assembly option. In another aspect of the illustrated embodiment, the display surface depicts a full representational image of the different portions of the oversize document stored in memory including the alignment marks "×" 18. The user is able to control the reassembly process for the image by making appropriate choices and adjustments on a user interface.

In a different embodiment of the present invention the copier automatically assembles the images of document portions in memory without user input. The user affixed marks are automatically aligned, the excess duplicative image content is trimmed and the reassembled image may be presented to the user on a display surface for verification. If the user verifies that the image processing software has reassembled the images correctly, the document is printed. If the image has not been reassembled correctly, the user may manually manipulate the image using the user interface to complete the reassembly process. Alternatively, the image may be stored in permanent memory for later use.

In another aspect of the present embodiment the oversize document 4 is copied in portions after the user selects an oversize copy mode at a user interface on the copier. The copying in portions is done without the user affixing a mark 18 to the different portions of the image. Rather, the image processing software manipulates the images in memory by searching for recognized characteristics that occur in more than one image portion. For example, the oversize document 4 depicts the phrase "RED AND BLUE" with the letters N and part of D appearing in both the left 6 and right 12 sub-documents. The image processing software recognizes the image patterns of the letters and uses them to align the overall document. Upon re-assembly, the overlapping portion of the document will be trimmed so as not to be duplicative and the final image printed for a user. Alternatively, the automatically re-assembled image may be presented to the user for verification that the assembly process was performed correctly. Upon verification, the document may be printed.

In one aspect of the present invention, an oversize document 4 is reproduced without utilizing overlapping sub-documents. The oversize document is split into sub-documents, each sub-document beginning exactly at the point where the adjacent sub-document ended. For example, an oversized poster might be physically cut in half with each half becoming a sub-document. The image processing software recognizes features in the sub-documents and reassembles the oversize document in memory by connecting adjacent features which were separated in the process of creating the sub-documents. This process requires careful measurements during the process of creating the sub-documents so as not to omit data or include duplicative data.

FIG. 2 depicts a scanner surface with the dimension of 9"×12" (22). FIG. 2 also depicts an oversize document 23 which has been partitioned according to the illustrated embodiment. The scanner surface 22 may be part of a scanner connected to a computer-system, or, alternatively, it maybe part of a multi-function electronic device such as a device equipped with both a scanner and a printer. The illustrated embodiment of the present invention requires a user to partition a document into portions with dimensions scannable by a scanner surface 22. Accordingly, the oversize document 23 has been split into a left portion 24, a middle portion 26, and a right portion 28. The left portion 24 includes a left edge 30 and a right edge 32, the middle portion 26 includes a left edge 34 and a right edge 36, and the right portion 28 includes a left edge 38 and a right edge 40. Also depicted are user affixed marks 42 shown as the letter "×". The original oversize document 23 possesses dimensions of 11"×24". The document partitioned by the illustrated embodiment will consist of three portions having dimensions of 11"×9" so that they will fit entirely within the 9"×12" scanner surface 22. The areas which are present in both the left and middle portions of the partitioned document and the middle and the right portion of the document respectively include a user affixed mark 42.

The scanning process begins when a user selects the oversize mode on the scanner user interface prior to performing the first of three scans. Upon completion of the third scan, the user selects a command on the scanner user interface that indicates the scanning process is complete. Alternatively, at the time the user selects the oversize mode option on the scanner, the user may indicate the number of sub-documents that will be scanned. Image processing software in memory reassembles the three portions of the oversize document 23. The memory holding the images of the document portions may be in a computer system in the event that a scanner connected to a computer system is being employed, or, the memory maybe in a multi-function electronic device in the event the scanner is part of a multi-function electronic device. The reassembly process may be a completely automated process or one requiring user input as described above. The scanner may have a display surface enabling the user to manipulate the image portions of the oversize document during reassembly. Alternatively, the user may issue commands to a computer system containing image processing software which has an attached monitor capable of displaying the image portions to the user during the reassembly process.

Figure 3A:
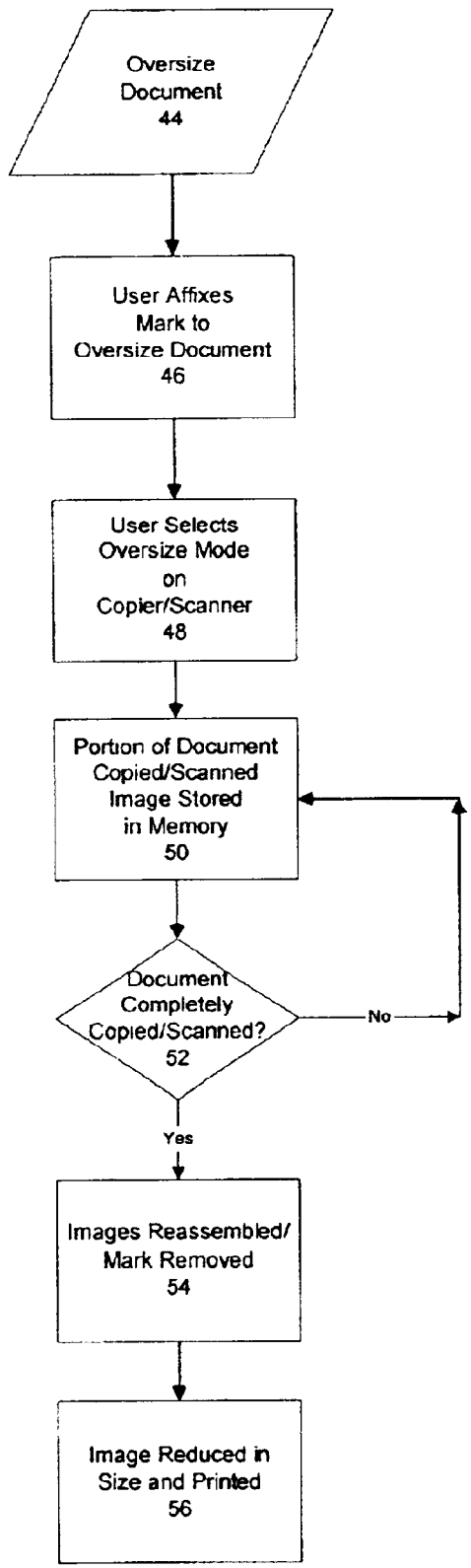
FIG. 3A is a flow chart of the sequence of steps performed by the illustrated embodiment of the present invention when a user affixes marks to an oversize document.

The sequence of steps utilized in the illustrated embodiment is the same regardless of whether or not a copier or scanner is employed in duplicating an oversize image. FIG. 3A depicts a flow chart of the sequence of steps utilized in one embodiment of the present invention when a user is required to affix a mark(s) to an oversize document. A user selects an oversize document (step 44) which has dimensions exceeding the available copier/scanner surface. The user affixes a mark or marks to the oversize document (step 46) in a place that will cause the mark to appear in the adjoining portions which are about to be copied/scanned. The mark may be made with a special ink as previously described or may be a certain character that the image processing software has been programmed to locate. The user then selects the oversize mode on the copier/scanner so that the upcoming successive images will be held in memory (step 48). The user copies/scans each of the portions of the oversize document in turn (step 50) and selects a user command to indicate when the copying/scanning is complete (step 52). The images in memory are reassembled and the mark affixed by the user is removed (step 54). The reassembled image is then reduced in size and printed out for the user (step 56).

Figure 3B:
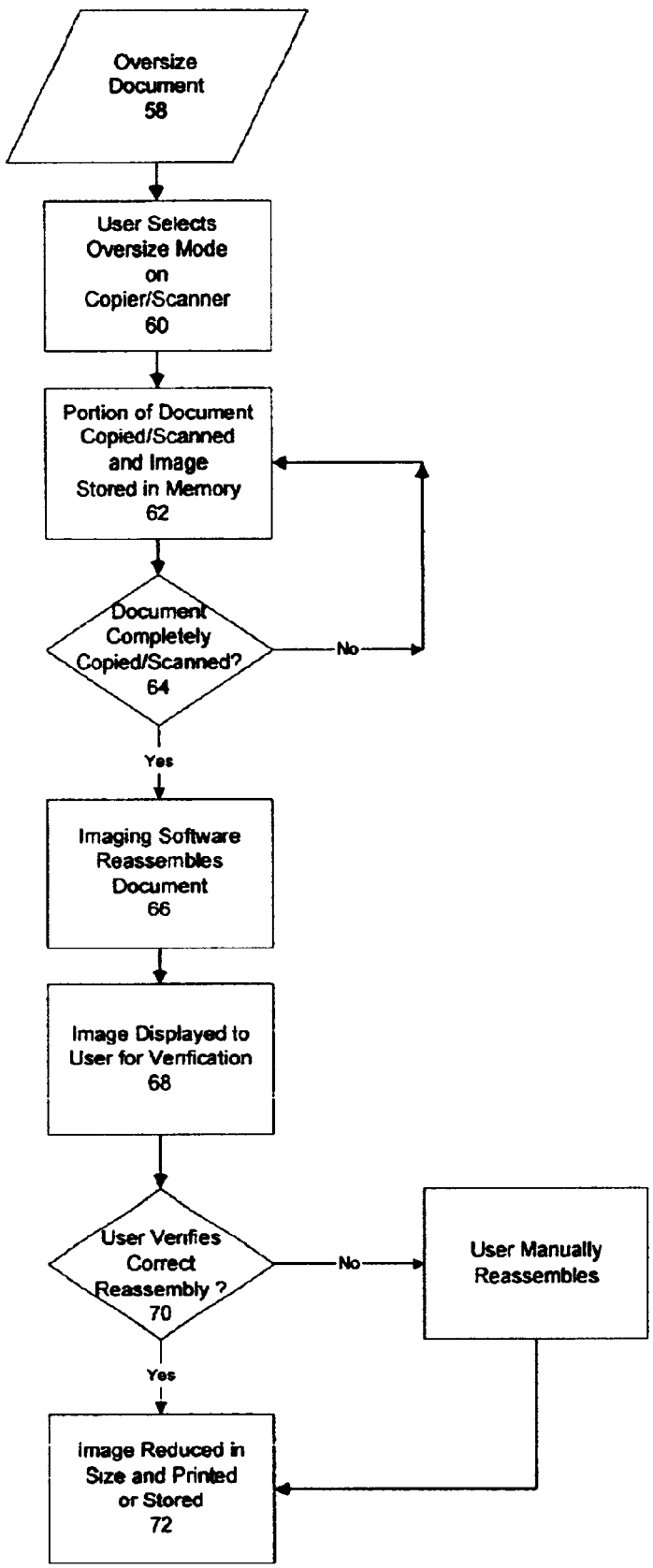
FIG. 3B is a flow chart of the sequence of steps performed by the illustrated embodiment of the present invention when a user does not affix marks to an oversize document.

FIG. 3B depicts a flow chart of the sequence of steps utilized in one embodiment of the present invention when a user is not required to affix a mark(s) to an oversize document. A user selects an oversize document (step 58) which has dimensions exceeding the available copier/scanner surface. The user then selects the oversize mode on the the copier/scanner so that the upcoming successive images will be held in memory (step 60). The user copies/scans each of the portions of the oversize document in turn (step 62) and selects a user command to indicate when the copying/scanning is complete (step 64). The images in memory are reassembled and aligned (step 66) and the image is displayed on a display surface to the user for verification (step 68). In the case of a copier, the display surface may be part of the user interface or the display surface may be a display panel located adjacent to the user interface. In the case of a scanner, the display surface may be a display panel on the multi-function electronic device which contains the scanner, or in the event the scanner is a stand-alone model, the display surface may be a computer monitor connected to the computer system to which the scanner is interfaced. After observing the image, the user indicates via the user interface of the copier/scanner whether or not the image has been reassembled correctly (step 70). In the event the image has not been reassembled correctly, the user may manually manipulate the image to complete the reassembly process (step 71). If the image has been reassembled correctly, the reassembled image is then reduced in size and printed out for the user (step 72).

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps depicted in the figures may be altered without departing from the scope of the present invention and that the illustrations contained herein are singular examples of a multitude of possible depictions of the present invention.

I claim:

1. A method for copying documents with an image reproducing apparatus, said method comprising:
   providing an image reproducing apparatus, said image reproducing apparatus including memory, a processor, a user interface and a reproducing surface, said reproducing surface possessing a first dimension;
   reproducing a document, said document possessing a second dimension, said second dimension being greater than said first dimension, said reproducing occurring in portions of less than the whole document, said image reproducing apparatus holding an image of each said document portion in memory; and
   manipulating said document portions in memory so that said document portions align to form a continuous image and so as to eliminate any duplicative overlapping document portion,
   wherein a user of said image reproducing apparatus affixes a mark on said document such that said mark will be contained within the image of each said document portion stored in memory,
   wherein image processing software overlays said mark from an image of one portion of said document with the same mark contained in an image of an adjoining portion of said document to form said continuous image in memory, and
   wherein said mark is made in a manner recognizable by said image processing software, said image processing software deleting said mark from said continuous image in memory by replacing said mark with adjacent image content prior to printing said continuous image.

2. The method of claim 1 further comprising:
   printing said continuous image as the output of said image reproducing apparatus.

3. The method of claim 2 further comprising:
   reducing said continuous image in memory to a dimension compatible with print media available to said image reproducing apparatus prior to printing said continuous image.

4. The method of claim 1 wherein said mark is made with an ink recognizable by said image processing software, said image processing software deleting said recognized ink mark from said continuous image in memory prior to printing said continuous image.

5. The method of claim 1 further comprising:
   providing a user interface for said image reproducing apparatus, said user interface including a display component and user controls, said controls enabling a user to align said images; and
   aligning said mark by a user using said controls to manipulate images of said document portions rendered on said display component.

6. The method of claim 1 wherein said image processing software overlays a recognizable feature contained in an image from one portion of said document with the same recognizable feature contained in an image from an adjoining portion of said document to form said continuous image in memory.

7. The method of claim 6 wherein said image processing software executes automatically without user instruction.

8. The method of claim 6 further comprising:
   providing a user interface, said user interface including a display component; and
   submitting said continuous image to a user for verification of proper reassembly by displaying it on said display component.

9. The method of claim 1 wherein said image processing software connects a recognizable feature contained in an image from one portion of said document with the same recognizable feature contained in an image from an adjoining portion of said document to form said continuous image in memory.

10. A method for reproducing documents with an electronic device, said electronic device equipped with a scanner and printer, said method comprising:
    providing an electronic device, said electronic device including memory, a user interface and a processor;
    further providing a scanner incorporated into said electronic device, said scanner including a scanning surface, said scanning surface possessing a first dimension;
    scanning a document, said document possessing a second dimension, said second dimension being greater than said first dimension, said scanning occurring in portions of less than the whole document, said electronic device holding an image of each document portion in memory;
    manipulating said document portions in memory so that said document portions align to form a continuous image and so as to eliminate any duplicative overlapping document portion;
    wherein a user of said electronic device affixes a mark on said document such that said mark will be contained within the image of each said document portion stored in memory;
    wherein said image processing software overlays said mark from an image of one portion of said document with the same mark contained in an image of an adjoining portion of said document in forming said continuous image in memory; and
    wherein said mark is made in a manner recognizable by said image processing software, said image processing software deleting said mark from said continuous image in memory by replacing said mark with adjacent image content prior to printing said continuous image.

11. The method of claim 10 further comprising:

printing said continuous image with a printer incorporated into said electronic device.

12. The method of claim 11 further comprising:

reducing said continuous image in memory to a dimension compatible with print media available to said printer prior to printing said continuous image.

13. The method of claim 10 wherein said mark is made with an ink recognizable by said image processing software, said image processing software deleting said recognized ink mark from said continuous image in memory prior to printing said continuous image.

14. The method of claim 10 further comprising:

providing a user interface for said scanner, said user interface including a display component and user controls, said controls enabling a user to align said images; and aligning said mark by a user using said controls to manipulate images of said document portions rendered on said display component.

15. The method of claim 10 wherein said image processing software overlays a recognizable feature contained in an image from one portion of said document with the same recognizable feature contained in an image from an adjoining portion of said document to form said continuous image in memory.

16. The method of claim 15 wherein said image processing software executes automatically without user instruction.

17. The method of claim 15 further comprising:

providing a user interface, said user interface including a display component; and submitting said continuous image to a user for verification of proper reassembly by displaying it on said display component.

18. In a computer system, a method for copying documents, said method comprising:

providing a computer system, said computer system including memory, a user interface and a processor;

further providing a scanner connected to said computer system, said scanner including a scanning surface, said scanning surface possessing a first dimension;

scanning a document, said document possessing a second dimension, said second dimension being greater than said first dimension, said scanning occurring in portions of less than the whole document, said electronic device holding an image of each document portion in memory;

manipulating said document portions in memory so that said document portions align to form a continuous image and so as to eliminate any duplicative overlapping document portion;

wherein said image processing software overlays said mark from an image of one portion of said document with the same mark contained in an image of an adjoining portion of said document to form said continuous image in memory; and wherein said mark is made in a manner recognizable by said image processing software, said image processing software deleting said mark from said continuous image in memory by replacing said mark with adjacent image content prior to printing said continuous image.

19. The method of claim 18 further comprising:

printing said continuous image with a printer connected to said computer system.

20. The method of claim 19 further comprising:

reducing said continuous image in memory to a dimension compatible with print media available to said printer prior to printing said continuous image.

21. The method of claim 18 wherein a user of said computer system affixes a mark on said document such that said mark will be contained within the image of each said document portion stored in memory.

22. The method of claim 18 wherein said mark is made with an ink recognizable by said image processing software, said image processing software deleting said recognized ink mark from said continuous image in memory prior to printing said continuous image.

23. The method of claim 18 further comprising:

displaying said mark on a display component for said computer system; and aligning said mark with user input commands to said image processing software to manipulate images of said document portions rendered on said display component.

24. The method of claim 18 wherein said image processing software overlays a recognizable feature contained in an image from one portion of said document with the same recognizable feature contained in an image from an adjoining portion of said document in forming said continuous image in memory.

25. The method of claim 24 wherein said image processing software executes automatically without user instruction.

26. The method of claim 24 further comprising:

providing a display component with said computer system; and submitting said continuous image to a user for verification of proper reassembly by displaying it on said display component.

* * * * *